United States Patent [19]

Stouffer et al.

[11] Patent Number: 5,730,913
[45] Date of Patent: Mar. 24, 1998

[54] PROCESS FOR FORMING CRYSTALLINE POLYMER PELLETS

[75] Inventors: Jan M. Stouffer, Hockessin; Elwood Neal Blanchard, Wilmington, both of Del.; Kenneth Wayne Leffew, Kennett Square, Pa.

[73] Assignee: E. I. du Pont de Nemours and Company, Wilmington, Del.

[21] Appl. No.: 694,083

[22] Filed: Aug. 8, 1996

Related U.S. Application Data

[62] Division of Ser. No. 376,599, Jan. 20, 1995, Pat. No. 5,633,018.
[51] Int. Cl.$^6$ .................................................. B01J 4/02
[52] U.S. Cl. ........................................ 264/8; 264/13
[58] Field of Search ........................... 264/5, 6, 8, 13, 264/316; 425/6, 8

[56] References Cited

U.S. PATENT DOCUMENTS

| | | |
|---|---|---|
| 2,268,888 | 1/1942 | Mericola ............................ 425/6 |
| 4,165,420 | 8/1979 | Rinehart . |
| 4,236,882 | 12/1980 | Weinhold ........................... 425/6 |
| 4,279,579 | 7/1981 | Froeschke ......................... 425/6 |
| 4,578,021 | 3/1986 | Schermutzki ...................... 425/6 |
| 4,610,615 | 9/1986 | Froeschke ......................... 425/8 |
| 4,623,307 | 11/1986 | Froeschke ......................... 425/8 |
| 4,963,644 | 10/1990 | Duh . |
| 5,013,498 | 5/1991 | Froeschke ......................... 264/8 |
| 5,295,799 | 3/1994 | Prewitt ............................. 425/8 |
| 5,340,509 | 8/1994 | Chang et al. ...................... 264/5 |

Primary Examiner—Mathieu D. Vargot

[57] ABSTRACT

This invention relates to a process and apparatus for forming a polyester polymer into particles. More particularly, this invention relates to a process and apparatus for forming crystalline, uniform pellets from an amorphous polyester melt. The polyester pellets have utility, for example, as feedstock for a process for producing higher molecular weight polyesters.

11 Claims, 1 Drawing Sheet

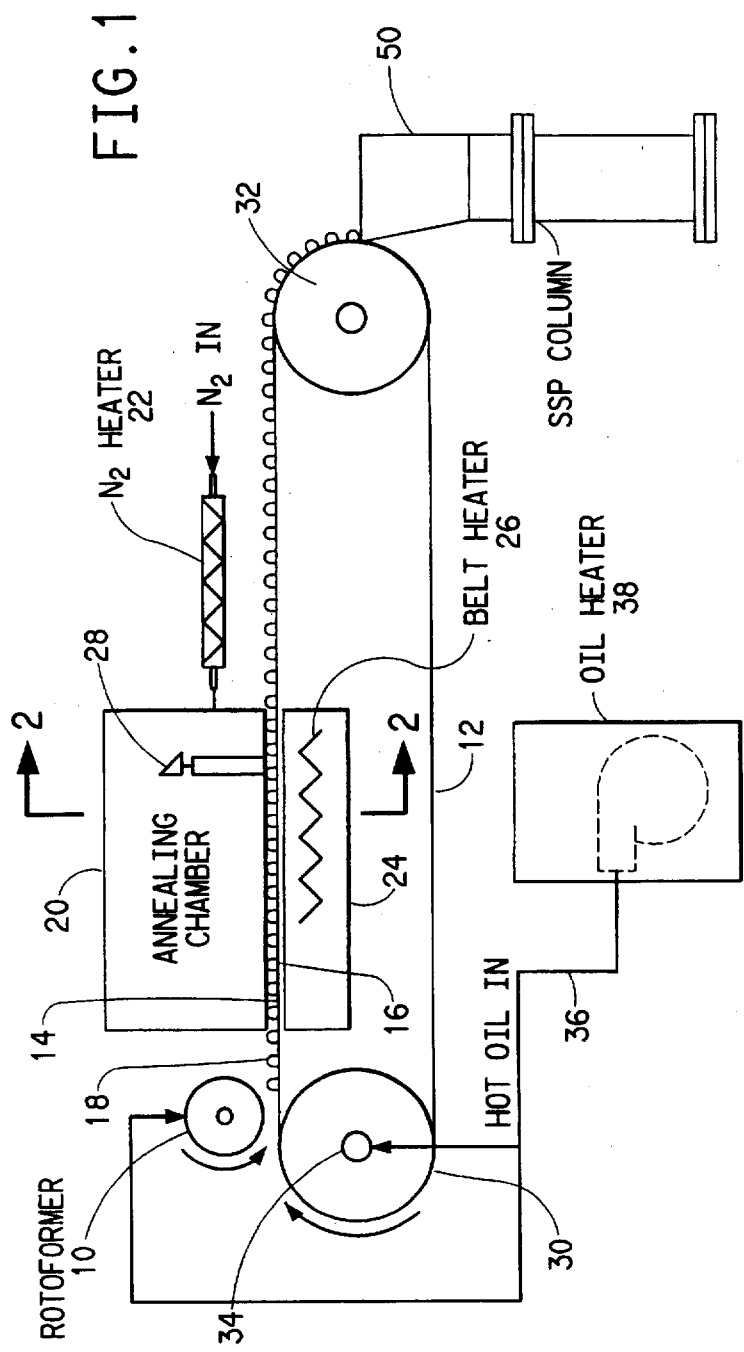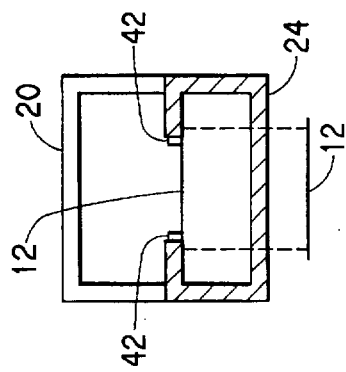

PROCESS FOR FORMING CRYSTALLINE POLYMER PELLETS

This is a division of application Ser. No. 08/376,599, filed Jan. 20, 1995, now U.S. Pat. No. 5,633,018.

FIELD OF THE INVENTION

This invention relates to a process and apparatus for forming a polymer into particles. More particularly, this invention relates to a process and apparatus for forming crystalline, uniform pellets from an amorphous polyester melt.

BACKGROUND

The formation of particles from viscous materials is well known. Conventional methods and apparatus often involve the formation of liquid portions or droplets which are subsequently collected and solidified. For example, Froeschke, U.S. Pat. No. 4,279,579, discloses an apparatus for the extrusion of a flowable mass onto a conveyor. The apparatus has inner and outer cylindrical coaxial containers. The inner container, positioned within the inner container, has a passage for dispensing the flowable mass. The outer container has a number of orifices and rotates around the inner container. As the outer container rotates, the orifices on the outer container cyclically align with the passageway on the inner container. With each alignment, the flowable mass flows from the inner container, through the aligned orifices, and is apportioned and deposited on a conveyor, for example a conveyor belt, to form what is often referred to as pastilles.

Chang et al., U.S. Pat. No. 5,340,509, discloses a pastillation process for pelletizing ultra high melt flow crystillation polymers, i.e., a crystalline polymer which is a polyolefin homopolymer, a polyolefin copolymer, or blends thereof. Initially, molten polymer is transferred to a droplet-forming means. The droplet-forming means is generally an outer container, with orifices, which rotates around an inner container to allow a uniform amount of the polymer melt to emerge as droplets. The droplets are collected on a conveyor, which cools the droplets for a time sufficient to solidify the droplets.

Forming robust, uniform, pellets of a polyester material has been difficult or problematic. For example, low molecular weight polyesters, characterized as oligomers or prepolymers, may have such a low viscosity that initial particle formation may be difficult. The oligomer may be too liquid to form particles or pellets of uniform shape and size. This is because oligomers, having relatively short chain length, may have a relatively low amount of chain entanglement, in addition to limited intermolecular bonding or forces.

Known processes for forming polyester particles may result in particles which lack structural integrity. The weakness of such particles may make them hard to handle and susceptible to abrasion during transport or other mechanical handling. Abrasion may generate undesirable amounts of fines.

Polyester particles are useful as feedstock to a process to produce a higher molecular weight polymer, including solid-phase ("solid-state") polymerization processes. For such processes, it is desirable that the particles have certain characteristics. For example, particles having relatively uniform size and shape, for uniform polymerization within each particle, may be desirable. For solid-state polymerization, it is desirable that the particles be sufficiently robust to withstand the high temperatures of solid-state polymerization without agglomerating.

Conventionally, robust particles of polyester may be obtained by subjecting the particles to a lengthy and expensive heat treatment or annealing step. Such annealing increases the crystallinity and robustness of the particles. Such annealing, however, typically adds time and expense to an overall process for producing high molecular weight product. It would be desirable to reduce or eliminate such annealing.

In view of the above, there exists a need for an improved process and apparatus for the formation of polyester particles. There is a need for the more economical and efficient production of quality polyester particles, which, for example, are useful under rigorous circumstances and with limited pre-treatment prior to use as feedstock for further polymerization. Furthermore, there exists a need for an improved process of forming a low molecular weight polyester oligomer into crystalline particles. In addition, it would be a further advantage if the resulting particles exhibited improved crystalline morphology or related properties compared to conventional processes.

SUMMARY OF THE INVENTION

This invention provides an apparatus for producing pellets of a polymer from its polymer melt, comprising:

(a) a pellet former comprising a rotatable container having a plurality of outlets, defining corresponding openings 0.5 to 5 mm in diameter, for metering a polymer melt onto the surface of a conveyor;

(b) a conveyor comprising a surface, which is adapted for movement relative to the outlets of the pellet former, for receiving the polymer melt, from the pellet former, in the form of a plurality of droplets or crystallizing pellets, said conveyor being adapted for conveying the pellets through a crystallization section; and (c) a crystallization section extending from the point at which the pellets are received onto the surface of the conveyor, extending along at least a portion of the conveyor to a point downstream; the crystallization section further comprising means for controlling the surface temperature of the conveyor within a predetermined temperature range above 50° C. as the surface passes through the crystallization section.

In commercial practice, the crystallization section may further comprise a temperature controller for controlling the temperature of the surface within the crystallization section, such that the pellets are subjected to a surface within a predetermined temperature range for a predetermined period of time.

The above-described apparatus may have a variety of uses, including the production of pellets of a polyester polymer having a glass transition temperature ($T_g$) greater than about 25° C. One such process comprises:

(a) metering a polymer melt of the polyester polymer through a multitude of outlets in a rotatable container, each outlet defining an orifice 0.5 to 5 mm in diameter, thereby forming a plurality of molten droplets;

b) collecting the molten droplets, immediately after being formed, on a solid moving surface, the solid moving surface being maintained within a predetermined temperature range within a heating zone, whereby the pellets are maintained in contact with the solid moving surface, within the heating zone, for a predetermined period of time.

BRIEF DESCRIPTION OF THE DRAWINGS

FIG. 1 is a schematic of the preferred process and apparatus for producing polymer pellets.

FIG. 2 is a cross-sectional view of the crystallization section of the apparatus of FIG. 1.

DETAILED DESCRIPTION OF THE INVENTION

This invention provides an apparatus and process for producing low molecular weight polymer particles or pellets. The polymer pellets are produced in a pellet former commonly referred to as a pastillator, and are collected on a hot surface. The hot surface controls the rate at which the pellets are relatively cooled (from the melt) and the temperature to which the pellets are relatively cooled. The pellets thus formed may have a relatively uniform size and shape. By the term "relatively uniform" is meant that at least 90 percent, by weight, of the pellets are within plus/minus 30 percent of the mean diameter. Preferably, at least 95 percent, by weight, of the particles are within plus/minus 10 percent of the mean diameter.

The present process is capable of producing pellets that are stronger and more abrasion resistant than pellets formed by various other conventional methods and apparatus. The pellets are suitable for transport or subsequent treatment by solid-state polymerization, with or without additional annealing.

One embodiment of the present invention, including an apparatus for producing pellets, is shown schematically in FIGS 1 and 2.

For purposes of this invention, the term "pellet" means any discrete unit or portion of a given material, having any shape or configuration, whether regular or irregular. Thus, the term "pellet" may encompass particles, droplets, pieces, portions, or pastilles of a given material. By the term "polymer" is meant a compound or mixture of compounds consisting essentially of repeating structural units called monomers, and is meant to include a prepolymer or a oligomer, that is, a polymer having a low molecular weight or a polymer intended as feedstock for a higher molecular weight polymer.

By the term "molten polymer" is meant polymer at a temperature at or above its melt temperature. Likewise, by the term "molten droplet" or "droplet" is meant a portion of a polymer at least partially at temperature at or above the melting point of the polymer. Thus, temperature gradients may exist in the droplet, which may start crystallizing immediately after being formed.

The melting point ($T_m$) of a polymer is preferably determined as the maximum of the main melting endotherm on the first heat, measured by Differential Scanning Calorimetry (DSC). By pellet size is meant the largest cross-sectional dimension of a given pellet.

As part of an integrated process, the droplet former may be in communication, via a conduit or other material transfer means, with a means for producing a polymer in melt form. A means for producing a polymer melt can encompass many variations. For example, the means can be an extruder which uses polymer in the form of flake, pellets or chips as a feedstock. An extruder can heat the feedstock to the melt temperature or higher and extrude the molten polymer in various shapes, for subsequent transfer to the droplet former.

The means for producing the polymer can also include a reactor for polymerization. Such a reactor is well known in the art. Polymerization is often carried out in the melt, and thus melt polymerizers are also suitable as a means for producing the polymer in melt form per this invention. An example of a preferred reactor for producing polymer melt is described in copending commonly-assigned application Ser. No. 08/376,596, now abandoned and refiled as CIP Ser. No. 08/576,657, filed Dec. 21, 1995, hereby incorporated by reference in its entirety. Of course, for use as feedstock for the present apparatus and process, it is also possible to commercially purchase polymer or to store previously made polymer for later introduction into a memos for producing a melt of the polymer.

One preferred embodiment of the present apparatus is schematically shown in FIG. 1. A pellet former 10 receives a polymer melt from a reactor or melt polymerizer (not shown). A conventional melt polymerizer, if employed, usually has an inlet for receiving reactants and an outlet connected to a conduit for transporting the polymer melt to the pellet former 10. The polymer exiting the outlet is typically at or above its melt temperature. The polymer can be transferred to a pellet former by means of any pressure displacing device such as a variable speed displacement pump or melt gear pump.

The pellet former 10 is commonly referred to as a pastillation apparatus or pastillator, in the broadest sense of the word. Various types of pastillators are known in the art for various uses. The pastillator, in one embodiment, may typically comprise inner and outer coaxial cylindrical containers. Accordingly, polymer melt transferred from the reactor would be received into the inner container or cylinder. The outer container has a plurality of orifices circumferentially spaced on the periphery of the outer container. The plurality of orifices are disposed such that they align with a metering bar or channel on the inner container when the outer cylinder is rotated. The orifices on the outer container can typically range in size from about 0.5 mm to about 5 mm. The inner cylinder containing the polymer melt is under pressure and dispenses the melt in uniform amounts as each of the plurality of orifices on the outer cylinder align with the metering bar or channel on the inner cylinder. Pastillators, as described, are commercially available, e.g., ROTOFORMER® manufactured by Sandvik Process Systems (Totawa, N.J.). In commercial use, for economic efficiencies of scale, maximum production, there may be many orifices on the outer cylinder of the pastillator, typically at least 100, for example, between 100 and 50,000, depending on the scale of operations. The pellets suitably may be produced on the scale of 1 kg to 10 metric tons per hour, preferably 1 to 10 metric tons per hour. For such operation, the pastillator would be adapted for rotating at a rate which is sufficient to supply pellets to the conveyor surface at the desired production rate.

Droplets or crystallizing pellets 18, formed by the pastillator 10, are directly received onto a moving surface 12 of a conveyor belt, which is substantially level. By "substantially level" is meant not varying by more than 10° from horizontal. By "moving surface" is meant any surface which can support and transport the pellets. The moving surface 12 generally moves relative to the pastillator, in a direction tangential to the direction of rotation of the outer container of the pastillator. The moving surface 12 has a bottom surface 16 and a top surface 14, the latter comprising the substantially level moving surface which supports the pellets. The moving surface 12 conveys the pellets through a crystallization section, which may also be referred to as a heating section. The moving surface is generally maintained at a constant speed for passing the pellets through the crystallization section, although the speed chosen can vary in order to vary the time the pellets are within the crystallization section.

A key feature or component of the present apparatus is the crystallization section. The crystallization section begins at or very near the point at which the pellets are received from the pastillator 10 onto the moving surface and extends along at least a portion of the conveyor moving surface.

An important feature of the crystallization section of the apparatus is that it includes means for controlling the temperature of the moving surface, as it passes through the crystallization section, at an elevated temperature. Ovens containing a heating coil may be employed. In the preferred apparatus of the present invention, the temperature of the top surface 14 within the crystallization section is maintained above 50° C., depending on the surface material of the conveyor. If the surface material is metal, then a conventional heater should be capable, in practice, of raising the temperature to at least 50° C., preferably at least 100° C., more preferably between 100° C. and 225° C., which may depend on the heat transfer coefficient of the surface. In the broad process of the invention, however, the temperature may vary below 50° C., if the conveyor surface has a lower heat transfer coefficient than metals such as steel.

The crystallization should be capable of maintaining a relatively steady temperature, although some gradient along the crystallization section is allowable. Preferably, the temperature of the surface in the crystallization section is carefully controlled, as further described below.

Preferably, a portion of bottom surface of the moving surface 12 is heated within the crystallization section. It is also possible to have a heater prior to the point at which the pellets are received on the conveyor surface, in which case the crystallization section may only require insulation and/or slight heating. The crystallization section may further comprise means for adjusting the temperature and/or flow of a heat-exchange fluid and supplying a flow of the heat-exchange fluid to the bottom surface 16, such as shown within the crystallization section 20 in FIG. 1. In the embodiment shown in FIG. 1, an air heater 26 supplies heated air to a lower plenum 24, enclosing a portion of the bottom surface 16 of the moving surface 12. The lower plenum 24 generally contains an inlet and outlet for the heat-exchange fluid, so the heat-exchange fluid can continuously circulate through the lower plenum 24. The lower plenum 24 extends along the portion of the moving surface 12 which comprises the crystallization section. In this way, the pellets 18 are subjected to proper heating immediately after being formed and collected on the moving surface 12.

In order to obtain rapid heat transfer from the moving conveyor surface to the just-formed polymer pellets, it is preferred that the material for the conveyor moving surface 12 have a relatively high heat transfer coefficient. Metals are particularly useful for this purpose, especially metals, such as steel, with high heat transfer coefficients. Thus metals are the preferred materials for the conveyor moving surface, although other materials, for example, plastic or plastic coatings are possible.

The temperature of the top surface 14 of the moving surface 12 within the crystallization section may be controlled automatically or manually with the use of a temperature sensor 28 located within the crystallization section. Preferably, however, a temperature controller may automatically control the temperature of the top surface 14 of the moving conveyor surface 12 in the crystallization section within a predetermined temperature range. Controlling the temperature, in combination with controlling the speed of the conveyor moving surface supporting the pellets, will result in the pellets 18 being subjected to the predetermined temperature range for a minimum amount of time which can be predetermined. This occurs as the pellets 18 pass through the crystallization section. Generally, the temperature controller comprises a sensor 28 for determining the temperature of the top surface 14 within the crystallization section, a comparator (not shown) for comparing the temperature determined by the sensor to a set point within the predetermined temperature range, and a temperature adjustor (not shown) for adjusting the temperature of the heat-exchange fluid supplied to the bottom surface 16 of the moving surface 12. Conventional temperature controllers are well known in the art, as will be appreciated by the skilled artisan, and are commercially available from a wide variety of sources.

Controlling the temperature of the metal surface of the belt may at times require the removal of heat from the heat exchange fluid or bottom surface 16, i.e., relative cooling, although the crystallization section may be heated relative to ambient. Typically, when a heat exchange fluid is supplied in a continuous flow to the bottom surface 16, and the set-point temperature is exceeded, a controller will typically signal no additional heat input. This does not, however, contravene the spirit of the invention, since the general result is heating of the bottom surface 16, and consequently the top surface 14.

In FIG. 1, a heater for the bottom surface 16 of the moving surface 12 is within the crystallization section. The primary function of the heater is to heat the moving surface 12 such that the top surface 14 is within a predetermined temperature range. Heating the moving surface 12 so that it is maintained at a temperature within the predetermined temperature range can be accomplished by a variety of means known to those skilled in the art. Various embodiments and apparatus for heating are encompassed within the scope of this invention.

In the preferred embodiment of FIG. 1, heating is primarily by means of heating the bottom surface 16 of the moving surface 12. The overall system may also include additional, auxiliary heating means. For example, a second temperature-controlled (i.e., generally heated) heat-exchange fluid, preferably an inert gas to avoid degradation of the pellets 18, can be supplied to heat the portion of the top surface 14 supporting the pellets that is within the crystallization section. Preferably the gas is inert. Suitable gases include nitrogen, the noble gases such as argon and helium, oxygen, air, and the like.

In this preferred embodiment, the pellets 18 are subjected to temperature control, at an elevated temperature, by means of both the hot moving surface 12 and from the flow of heated inert gas. The inert gas is preferably at a temperature less than that of the top surface 14. For example, for PET, the temperature of the inert gas, e.g., nitrogen, typically ranges from 25° C. up to 100° C., although higher temperatures are feasible.

A flow of heated inert gas over the pellets may be provided in order to control the temperature gradient that will exist through the thickness of each pellet, thus serving to achieve more uniform crystallization throughout each pellet. The more uniform the temperature is throughout the pellet during the minimum predetermined amount of time, the more uniform the crystallization will be within each pellet, although temperature gradients within the pellets, to some extent, will likely occur while within the crystallization section. An important goal of the crystallization section is to get the temperature of the polymer pellets to the desired crystallization temperature as rapidly as possible and to maintain it at a predetermined temperature for a minimum period of time.

As indicated above, while controlling the temperature of a continuous flow of inert gas, there may be temporary periods of time when the gas is not heated, in order that the set-point temperature is obtained. The overall effect, however, is to control the temperature, by means of the gas, the environment surrounding the just-formed pellets 18.

A second means for heating and supplying a continuous flow of a second heat-exchange fluid is shown in FIG. 1 as a heater 22 for heating a flow of nitrogen supplied to an upper plenum 20. The upper plenum 20 can enclose the top surface 14 within the crystallization section, and generally contains an inlet and an outlet for continuously circulating the nitrogen through the upper plenum 20.

FIG. 2 is a cross-sectional view of an upper and lower plenum encasing the crystallization section. As shown in FIG. 2, a conveyor belt 12 covers the upper opening of the lower plenum, 24. The roller for the belt is shown below by the dotted line. The conveyor belt 12 also serves to cover the bottom opening of upper plenum 20. Resting on the belt, seals 42, typically made of TEFLON® (DuPont, Wilmington, Del.), may be employed to prevent excess loss of the heat-exchange fluid which is circulated through the upper plenum 20.

As an example of auxiliary heating to assist in maintaining the temperature of the top surface 14 within a predetermined range, a third heat-exchange fluid can be supplied to an internal chamber 34 located in the upstream roller 30 of the conveyor. The internal chamber 34 may include an inlet and outlet which are connected by conduits to a means for heating and circulating the third heat-exchange fluid. FIG. 1 also shows a heated pump 38, within a hot oil bath 43, for supplying the third, heat-exchange fluid, e.g., a hot oil, through a conduit 36 to the internal chamber 34 of the upstream roller 30. The roller is preferably constructed of a heat-conductable material to ensure that heat from the heated oil is efficiently conducted from the internal chamber 34, through the roller 30 to the bottom surface 16 of the conveyor belt. Heating the upstream roll 30 as described provides supplementary heating which counteracts normal heat loss and lessens the burden on the primary heater 26. It would also be possible, however, to provide primary heating upstream of the pellets, in combination with supplemental heating and/or insulation following the point at which the pellets are received on the belt.

After the crystallization section, the now crystallized, low molecular weight pellets 18 can be collected and transported for further treatment.

The present apparatus can be used to make relatively robust and uniform pellets of a polyester polymer. One such process, which is particularly advantageous, will now be described.

In the preferred process, a polyester polymer in melt form having a desired intrinsic viscosity, IV is processed in an apparatus according to present invention. Generally, polymer having an IV ranging from about 0.05 to about 0.40 dl/g is suitable. An IV ranging from about 0.09 to about 0.36 dl/g is preferred.

The IV is determined as follows. A solvent is made by mixing one volume of trifluoroacetic acid and three volumes of methylene chloride. PET, in the amount of 0.050 g, is then weighed into a clean dry vial, and 10 mL of the solvent is added to it using a volumetric pipette. The vial is closed (to prevent evaporation of the solvent) and shaken for 30 min or until the PET is dissolved. The solution is poured into the large tube of a #50 Cannon-Fenske® viscometer, which is placed in a 25° C. water bath and allowed to equilibrate to that temperature. The drop times between the upper and lower marks are then measured in triplicate, and should agree within 0.4 sec. A similar measurement is made in the viscometer for the solvent alone. The IV is then calculated by the equation:

$$IV = Ln \frac{\text{(solution time/solvent time)}}{0.5}$$

The present process can be integrated with a method of producing a polymer in melt form. Producing the polymer in melt form can be accomplished in various ways, discussed above, and includes extruding polymer initially in the form of flake, pellets or chips. Additionally, an overall process can include polymerizing reactants in a reactor for polymerization, for example, by melt polymerization, as discussed above.

In the preferred process, the polyester is initially at a first temperature which is at or above its melting temperature. For polyesters of interest, this initial temperature would be above 200° C. For PET, this initial temperature would be equal to or greater than about 250° C. It is preferred that the polymer melt is essentially amorphous, i.e., less than about 5%, preferably less than 1% crystalline. If the polymer melt is not initially amorphous, and is instead semicrystalline, it is desirable for the polymer to be thoroughly and uniformly heated above its melting temperature to ensure the semicrystalline areas are sufficiently melted.

The polyester polymers, at the above-mentioned first temperature, is formed into pellets in a droplet or pellet former, described above. The pellets are collected, as they are formed, onto a substantially level surface which is maintained at a second temperature within a crystallization zone. (By substantially level is meant not more than 10° from horizontal). Pellets may be subjected to heating in the crystallization zone, as described with respect to the apparatus of this invention, particularly if the belt is metal. The key feature of the crystallization zone is that it allows temperature control of the just-formed pellets, such that the pellets are subjected to their desired crystallization temperature immediately after they are formed. Accordingly, pellets may be produced which are robust and uniform, even when involving low molecular weight polymer. Such pellets are suitable for transport and further polymerization, for example, solid-state polymerization.

In order to form polyester pellets suitable for transport and further processing, such as solid-state polymerization, the pellets should be subjected to contact with a conveyor surface at a temperature within a predetermined temperature range as rapidly as possible after formation. This predetermined temperature range for polyesters preferably ranges from about 80° C. to about 230° C., preferably about 110° C. to about 190° C.

Additional preferred process embodiments are also described in cocurrently filed commonly-assigned applications Ser. No. 08/375,873, now U.S. Pat. No. 5,540,868 and Ser. Nos. 376,596, now abandoned and refiled as CIP Ser. No. 08/576,657, filed Dec. 21, 1995, respectively, all three applications hereby incorporated by reference in their entirety.

Subjecting the just-formed polymer pellet to a surface temperature within the predetermined temperature range will result in an immediate temperature gradient between the polymer pellet, initially at or near its melt temperature, and its surroundings. This should be done as quickly as possible in order to obtain the desired crystalline morphology formed. The crystalline morphology is related to the robustness and abrasion resistance of the pellets, especially the robustness during later polymerization.

The pellets are maintained in contact with the hot surface for a predetermined amount of time, which for polyesters should be no less than about 3 seconds, preferably about 10 to 60 seconds. Generally, the time needed to produce low molecular weight, crystalline polyester pellets, having the desired crystallinity, will not exceed about several minutes, although it would not be detrimental to maintain the pellets at the desired temperature for longer periods of time, for example, 30 minutes or more.

The term "crystalline" is herein defined to mean a crystallinity content greater than about 15%, preferably greater than 20%, and most preferably greater than 30%, corresponding, respectively, for PET, for example, to a density greater than about 1.36 g/cc, preferably greater than about 1.37 g/cc, most preferably greater than 1.39 g/ml. Thus, the term essentially-crystalline or crystalline, as used herein shall include what is commonly referred to as "semi-crystalline," as are most polyesters of interest. The amount of crystallinity can be determined by DSC (differential scan calorimetry). For example, essentially-crystalline PET is characterized by a total heat of fusion, expressed in J/g, of at least about 20, more preferably about 35, when 140 J/g is used as the total heat of fusion of pure crystalline PET. Higher heats of fusion indicate more crystalline polymer. The percent crystallinity within a sample of a polyester material or pellet can be determined by comparing the heat of fusion (J/g) of the crystallites present with the heat of fusion of the "pure" crystalline polyester.

The polyesters employed in the present invention or process comprise diacid or diester components, suitably including alkyl dicarboxylic acids which contain from 4 to 36 carbon atoms, diesters of alkyl dicarboxylic acids which contain from 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, or diesters of alkyl substituted aryl dicarboxylic acids which contain from 11 to 22 carbon atoms. The preferred alkyl dicarboxylic acids contains from 4 to 12 carbon atoms. Some representative examples of such alkyl dicarboxylic acids include glutaric acid, adipic acid, pimelic acid and the like. The preferred diesters of alkyl dicarboxylic acids contain from 6 to 12 carbon atoms. A representative example of such a diester of an alkyl dicarboxylic acid is azelaic acid. The preferred aryl dicarboxylic acids contain from 8 to 16 carbon atoms. Some representative examples of aryl dicarboxylic acids are terephthalic acid, isophthaic acid and orthophthalic acid. The preferred diesters of aryl dicarboxylic acids contain from 10 to 18 carbon atoms. Some representative examples of diesters of aryl dicarboxylic acids include diethyl terephthalate, diethyl isophthalate, diethyl or orthophthalate, dimethyl naphthaate, diethyl naphthalate and the like. The preferred alkyl substituted aryl dicarboxylic acids contain from 9 to 16 carbon atoms and the preferred diesters of alkyl substituted aryl dicarboxylic acids contain from 11 to 15 carbon atoms.

The diol component for polyesters used in the invention herein suitably comprises glycols containing from 2 to 12 carbons atoms, glycol ethers containing from 4 to 12 carbon atoms and polyether glycols having the structural formula HO—(AO)$_n$H, wherein A is an alkylene group containing from 2 to 6 carbon atoms and wherein n is an integer from 2 to 400. Generally, such polyether glycols will have a molecular weight of about 400 to 4000.

Preferred glycols suitably contain from 2 to 8 carbon atoms, with preferred glycol ethers containing from 4 to 8 carbon atoms. Some representative examples of glycols, which may be employed as the diol component of the polyester, include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like. Some representative examples of polyether glycol (Polymeg®) and polyethylene glycol (Carbowax®).

Branched or unbranched polyesters can also be used. The present process is applicable to both polyester homopolymers and polyester copolymers thereof. Further, the process of this invention is particularly useful for polyesters that do not crystallize easily, i.e., which require heating, according to the present process, in order to crystallize. This would include, for example, poly(ethylene terephthalate) (PET), poly(ethylene naphthalate) (PEN), poly(trimethylene terephthalate) (3G-T), and poly(trimethylene naphthalate) (3G-N). Generally, such polyesters having a glass transition temperature, $T_g$, above about 25° C., and a melt temperature, $T_m$, usually ranging from about 200° C. to about 320° C.

Particularly preferred are polyesters modified with up to 10% by weight of a comonomer. Comonomers can include diethylene glycol (DEG), triethylene glycol, 1,4-cyclohexane dimethanol, isophthalic acid (IPA), 2,6-naphthalene dicarboxylic acid, adipic acid and mixtures thereof. Preferred comonomers for PET include 0–5% by weight IPA and 0–3% by weight DEG.

As indicated above the crystalline polymer pellets produced according to the present invention can be introduced into a solid-state polymerization reactor for increasing the molecular weight of the polymer. Preferably, the IV (intrinsic viscosity) of the polyester in the pellets is below 0.4, preferably below 0.36, most preferably below 0.3, and the IV of the polyester product of the solid-state polymerization reactor is above 0.5, preferably 0.6 to 1.2. For example, for PET, the solid-state polymerization is suitably run at a temperature between 200 and 270° C., preferably 220° and 250° C., provided it is below the melting point of the polymer for a period of time that is preferably less than 24 hours.

EXAMPLE 1

This example illustrates a design for a demonstration unit. PET with an IV of 0.21 dl/g and COOH ends of 92.5 Eq/10$^6$ g, which is produced by a melt-phase polymerization process is processed at 74 rpm through a twin screw, 28 mm barrel extruder with six heated zones. The temperatures in the zones are:

| T1 | T2 | T3 | T4 | T5 | T6 |
| --- | --- | --- | --- | --- | --- |
| 130° C. | 274° C. | 285° C. | 262° C. | 284° C. | 281° C. |

The discharge of the extruder is connected to a Zenith variable speed gear pump, the molten polymer material is pumped under pressure at a flow rate of =lbs/hr into a 60 cm (about two feet) wide ROTOFORMER® dropformer, manufactured by Sandvik Process Systems, Totowa, N.J. The orifices, aligned in rows along the ROTOFORMER® are 1.5 mm in diameter. The feed temperature of the molten polymer material at the entry of the ROTOFORMER® is about 285° C. The molten polymer material is dropformed in the form of droplets onto a conveyor 13. 8 ft in length, which consists of a continuously moving steel belt, which is also manufactured by Sandvik Process Systems. The belt is heated by forced convection from an air blower which heats the bottom of the belt over approximately its entire length to about 160° C. The molten polymer droplets are solidified on the belt to provide uniform, hemispherical particles which are conveyed to a collection bin. Based on experimental runs, in which the belt was not heated to an elevated temperature according to the present invention, it can be estimated that the head speed of the cylinder, the belt speed, and the average weight of the particles, if produced under the conditions described in this example, would be as follows.

TABLE I

| Example No. | Head Speed (ft/min) | Belt speed (ft/min) | Avg. Particle Weight (g) |
|---|---|---|---|
| 1 | 25.9 | 30 | 0.0369 |
| 2 | 33.3 | 30 | 0.0236 |
| 3 | 27.9 | 30 | 0.0221 |
| 4 | 87.6 | 60 | 0.0140 |

What is claimed is:

1. A process for producing pellets of a polyester polymer having a glass transition temperature $T_g$ greater than about 25° C., from its polymer melt, comprising:

(a) forming the polymer melt into molten droplets, wherein the molten pellets are formed by a droplet former comprising a rotatable container having a plurality of outlets, each 0.5 to 5 mm in diameter, for metering a polymer melt onto a moving solid surface; and (b) collecting the molten droplets or crystallizing pellets, as they are formed, onto said surface, the surface being maintained within a predetermined temperature range above 50° C. within a crystallization zone by adding or removing heat, such that the crystallizing pellets are maintained in contact with the surface within the crystallization zone for a predetermined period of time during crystallization, thereby producing crystallized polyester particles 500 microns to 2 cm in average diameter.

2. The process of claim 1, wherein said surface is part of at least one conveyor belt comprising a top and bottom surface, the top surface forming said surface for receiving pellets from the pellet former.

3. The process of claim 1, wherein the surface is metal and the predetermined temperature range is between 80° C. and a temperature which is 30° C. below the melting point of the polyester.

4. The process of claim 1, wherein the polyester is polyethylene terephthalate, the surface is metal, and the predetermined temperature range is between 80° C. and 230° C.

5. The process of claim 1, wherein the monomeric units of the polymer comprise a diacid or diester, wherein the diol is selected from the group consisting of 1,3-propanediol, ethylene diol, and 1,4-butane diol.

6. The process of claim 1, wherein the polymer is selected from the group consisting of poly(ethylene terephthalate), poly(ethylene napthalate), poly(butylene naphthalate, poly (trimethylene terephthalate) and poly(trimethylene naphthalate).

7. The process of claim 6, wherein the polymer is modified with up to about 10% by weight of a comonomer.

8. The process of claim 7, wherein the comonomer is selected from the group consisting of: diethylene glycol, isophthalic acid, triethylene glycol, 1,4-cyclohexane dimethanol, 2,6-napthalene dicarboxylic acid, adipic acid and mixtures thereof.

9. The process of claim 1, wherein the pellets formed have an average pellet size of about 1 to 10 mm.

10. The process of claim 1, wherein the predetermined period of time is at least 3 seconds.

11. The process of claim 10, wherein the predetermined period of time is between 3 seconds and 10 minutes.

* * * * *